June 8, 1937.  C. P. ABRAMS  2,082,998
HEATING-COOLING DEVICE FOR AUTOMOBILES
Filed June 24, 1935  3 Sheets-Sheet 3

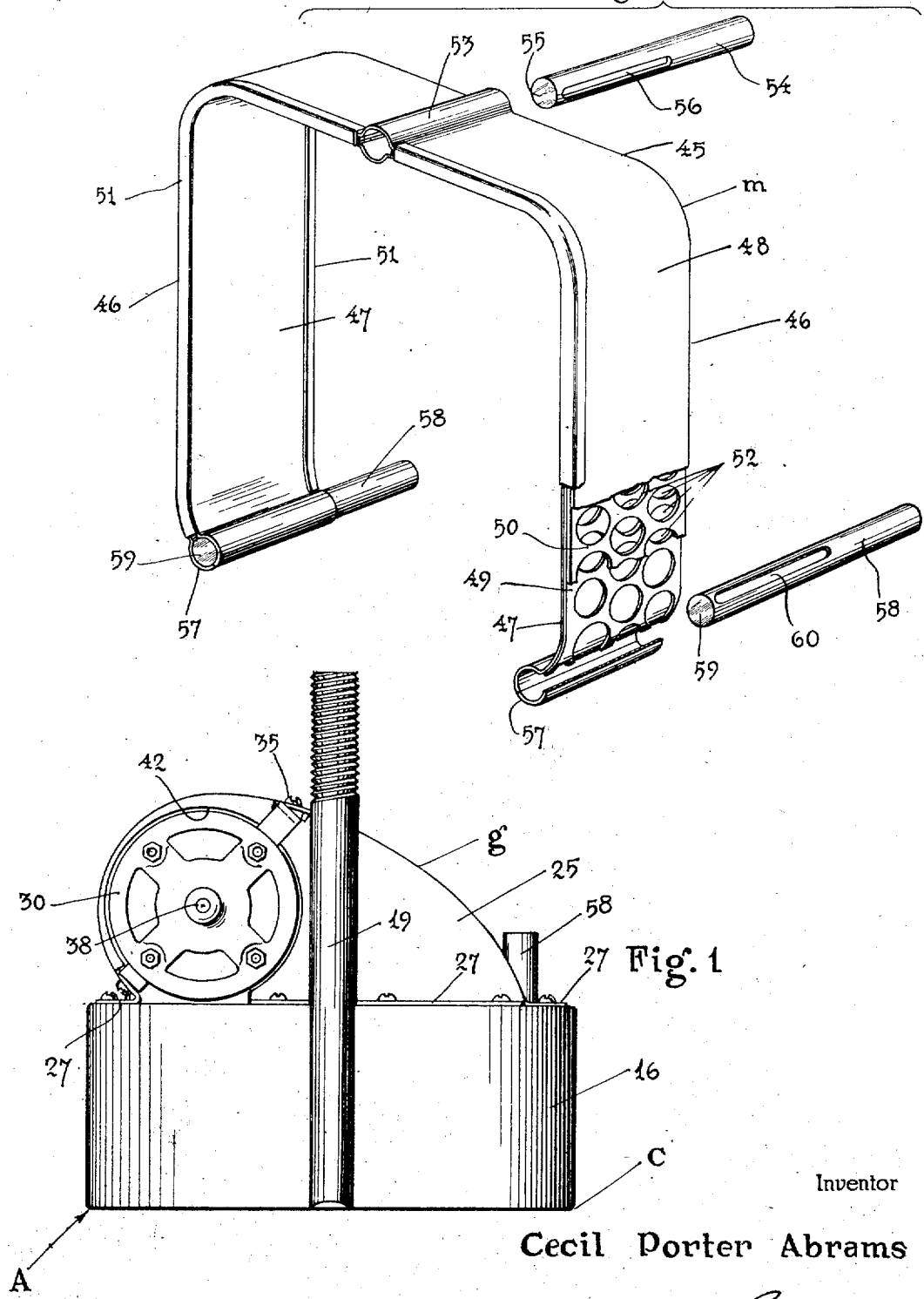

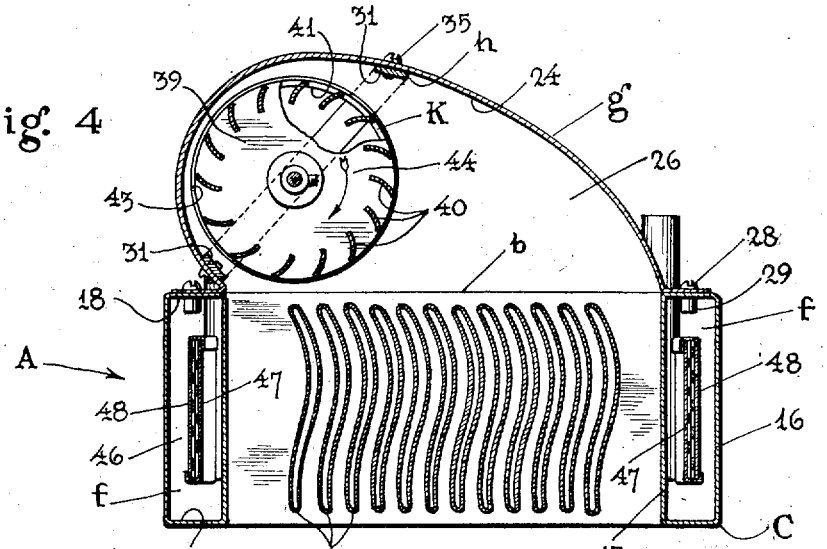

Inventor
Cecil Porter Abrams

By Caswell & Lagaard
Attorneys

Patented June 8, 1937

2,082,998

UNITED STATES PATENT OFFICE 2,082,998

HEATING-COOLING DEVICE FOR AUTOMOBILES

Cecil Porter Abrams, Anoka, Minn., assignor to C. L. Horn, Minneapolis, Minn.

Application June 24, 1935, Serial No. 28,139

12 Claims. (Cl. 257—7)

My invention relates to improvements in air conditioning devices, particularly, though not exclusively, for heating and cooling the tonneau compartments of automobiles.

At the present time, extensive use is made of a well known type of automobile heater consisting of a radiator or heat exchange unit which is installed in the tonneau compartment, such unit being heated by a circulating liquid deriving its heat from the automobile engine and, in turn, heating the air in the tonneau compartment which is forced through the unit by means of an air circulating fan.

An object of the present invention is to provide a simple, durable and compact heat exchange device, generally of the nature of the heater above referred to, but which is designed to enhance the efficiency of such a structure for heating purposes and, at the same time, to provide for the ready conversion of the structure for the efficient cooling of the air in the tonneau compartment.

Another object of the invention is to provide a device of the present character having a heat exchange unit in which the heat transferring liquid is trapped and refrigerated when the device is converted to use for cooling purposes.

A feature of the invention resides in supplying the core of the heat exchange unit with a jacket forming headers at the top and bottom of the core and also header connecting conduits at the sides thereof, which house the branches of a refrigerating element employed to cool the liquid in the unit and cause the gravitating circulation thereof through jacket and core.

A further object of the invention is to provide in a heat exchange unit of the present character, a core that is highly efficient in the transference of heat and a blower so constructed and combined with such core as to promote corewide uniformity in the movement of air therethrough.

Other objects of the invention reside in the novel combination and arrangement of parts and in the details of construction hereinafter illustrated and/or described.

Figure 5:
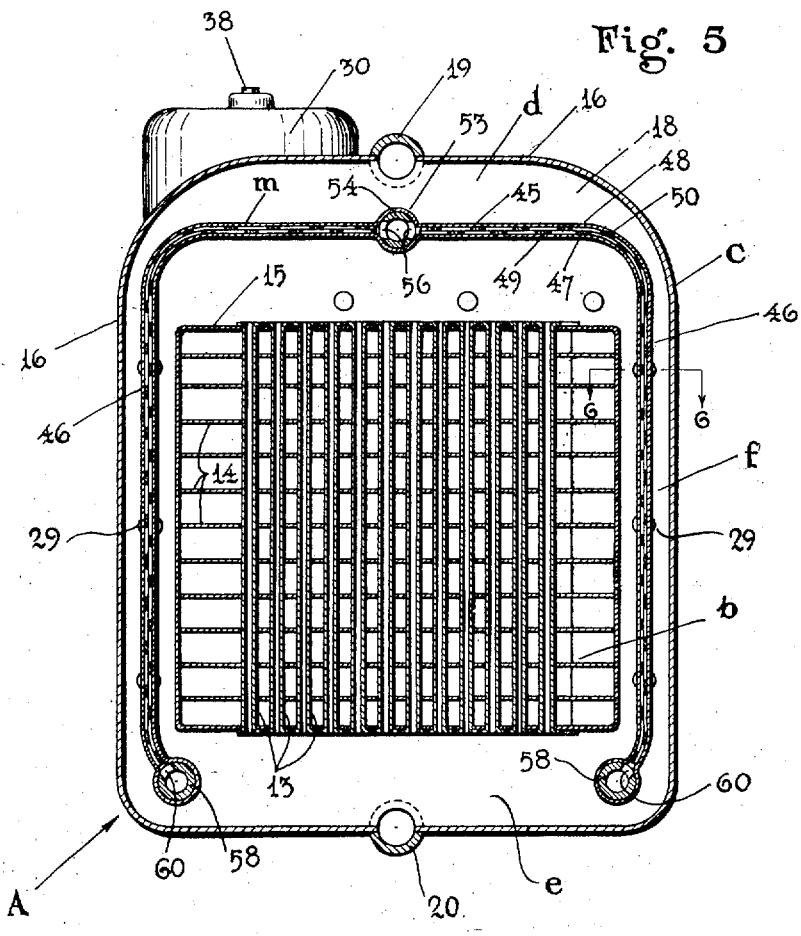
Figure 6:
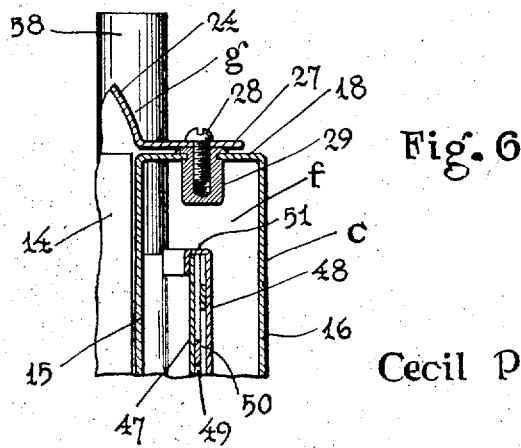

In the drawings, Fig. 1 is a plan view of a heat exchange unit constructed in accordance with my invention; Fig. 2 is a perspective view in detail of the cooling element which is disposed within the jacket of the unit; Fig. 3 is a vertical central sectional view of the unit in position on the dash of an automobile; Fig. 4 is a sectional view taken as on the line 4—4 of Fig. 3; Fig. 5 is a sectional view taken as on the line 5—5 of Fig. 3, and Fig. 6 is a sectional view, in detail, taken as on the line 6—6 of Fig. 5.

The ordinary motor vehicle construction being so well known, it is unnecessary herein to dwell upon the details of construction of a motor vehicle tonneau or the water cooled internal combustion engine commonly employed in powering such a vehicle. The drawings, therefore, in so far as vehicle construction is concerned, are limited to the disclosure of a motor vehicle dash 10 and the familiar feed and return lines 11, 12 through which the customary hot water radiator is tapped into the liquid cooling system of a water jacketed, internal combustion engine.

In my invention, the heat exchange unit, indicated in its entirety by the reference letter A, includes a core $b$ and a jacket $c$. Said core $b$ consists of a plurality of upright flattened tubes which, in horizontal cross-section, are reversely curved, as best shown in Fig. 4. Heat exchange fins 14 traverse the battery of tubes 13, each fin being in contact with each of said tubes. The jacket $c$, encompassing the core $b$, has an inner wall 15, outer wall 16, front wall 17 and rear wall 18, such structure providing upper and lower tanks or headers $d$, $e$ for the core tubes 13 and header connecting conduits $f$ at the sides of the core. The connections between the tubes 13 and the upper and lower headers $d$, $e$ are best illustrated in Fig. 5, wherein the ends of said tubes are shown as being inserted into said headers through slots formed in the inner wall 15 of the jacket $c$. A feed and mounting pipe 19 secured to the upper header $d$ communicates with the interior of said header centrally thereof at its upper portion, while a return and mounting pipe 20 secured to the lower header $e$ communicates with the interior of said lower header centrally thereof at its lower portion.

The ends of the feed and return pipes 19, 20 are passed through openings in the dash 10, said pipes being fitted with paired clamping nuts 21 which engage opposite sides of said dash and firmly anchor the entire unit thereto. At the extremity of the feed pipe 19 is a valved fitting 22 by means of which the liquid feed line 11 is coupled to said pipe 19 and through which the flow of liquid from said feed line 11 to the header $d$, is cut off. Similarly, the return pipe 20 is supplied at the end thereof with a valved fitting 23 through which the pipe 20 is coupled to the line 12 for returning liquid from the header $e$ to the engine. This fitting 23 also serves to cut off the unit from said return line 12. With said two valved fittings 22, 23, the entire liquid contents of the unit A is trapped therein in converting the device to use as a cooling medium, as will more fully hereinafter appear. Secured to the radiator jacket c is a casing g having a curved back wall 24 and top and bottom walls 25, 26, said casing having a front opening which registers with the space, centrally of the jacket c, in which the core b is disposed. Each of the walls 24, 25 and 26 of said casing c has an outturned flange 27 thereon. These flanges receive anchoring screws 28 which are threaded into nuts 29 secured to the back wall 18 of the jacket, the number of such screws and nuts being amply sufficient to anchor the casing g rigidly to the radiator jacket c.

Mounted on the casing g is a frame h which supports a cylindrical blower wheel k and an electric motor 30 for driving said wheel. This frame, shown as being constructed from band iron, includes two upright members 31 with upper and lower cross-members 32, 33 and an intermediate cross-member 34 extending from one of said upright members to the other thereof. The upright frame members 31 are fastened by means of screws 35 to the curved wall 24 of the casing. The lower and intermediate cross-members 33, 34 of said frame are fitted with bushings 36, in which the shaft 37 of blower wheel k is journaled. The electric motor 30, surmounting the upper cross-member 32 of the frame h is secured thereto by means of screws in such a manner that the drive shaft 38 of said motor extends vertically with the lower end thereof projecting downwardly through an opening in said member 32. This end of said motor shaft 38 is keyed to the upper end of the blower shaft 37 (Fig. 3) and with motor and blower thus connected, the latter is rotated when the former is operated.

The cylindrical blower wheel k is of the centrifugal type receiving its air supply axially thereof and discharging the same tangentially thereof. As illustrated, the blower wheel shaft 37 carries a mounting disk 39 to the periphery of which a number of upright blades 40 are medially secured. Rings 41 secured to the upper and lower ends of the blower blades 40 stiffen the blade assembly, leaving the ends of the blower wheel open for the reception of air which is drawn thereinto through registering openings 42, 43 in the upper and lower walls 25, 26 of the casing.

Attention should be given to the peculiar formation of the flattened core tubes 13 and to the relation between said tubes and the blower wheel k. These tubes 13, reversely curved in transverse cross section for the purpose of enhancing their heat exchange value, have their forward marginal portions so directed as to cause the air, issuing from the core, to pass directly forwardly from the unit upon its issuance therefrom. The rear marginal portions of the tubes 13 are directed toward the blower wheel k, which as clearly shown in Fig. 4, occupies a position well to one side of the core tube assembly. This relation of parts together with the curvature of the casing wall 24, as shown, is such that the output of the blower, turning in the direction indicated by the arrow 44, is equally distributed throughout the entire area of the core. With this result obtaining, the exchange of heat between the core tubes 13 and the air passing therebetween is substantially the same at all parts of the core, this being true longitudinally of the tubes 13 as well as laterally thereof since the blower wheel k is substantially equal in height to the height of said tubes.

Under heating, the valved fitting 22 is adjusted to permit the liquid, heated by the engine, to flow through the feed line 11 into the pipe 19 and thence into the upper header d. From said header d, the liquid descends through the tubes 13 to the lower header e and passing therefrom through the pipe 20, open fitting 23 and return line 12 finds its way back to the engine jacket. As the heated liquid passes through the tubes 13, heat therefrom is transferred through said tubes and the fins 14 to the air circulated through the core b by the blower k.

In the use of my invention for cooling the air in a tonneau or other compartment, the flow of heated liquid to and from the unit A through the feed and return lines 11, 12 is cut off. This is accomplished in the illustrated construction by closing the valved fittings 22, 23 whereupon the liquid contained within the unit A is trapped therein. This confined quantity of liquid is refrigerated by means of an evaporator m housed within the jacket c and conventionally connected with any suitable refrigerating equipment carried by the vehicle. Said evaporator m is of a strip-like construction in the form of an inverted U, the trunk portion 45 being disposed in the upper header d (Fig. 5) and the depending branches 46 being disposed in the upright header connecting conduits f at the sides of the jacket c. Four strips 47, 48, 49 and 50 of sheet material placed face to face are used in the construction of the evaporator m, one margin of the inner strip 47 and one margin of the outer strip 48 being turned over the corresponding edges of the remaining or filler strips 49, 50 to form flanges 51 which seal the strip assembly at the edges thereof. The filler strips 49, 50 are formed with corresponding rows of perforations 52 therein, each of the perforations in each row in each strip overreaching adjacent perforations in the corresponding row of the other strip to form thin circuitous passageways between the thin tubular shell formed by the strips 47, 48. Medially of the trunk portion of the evaporator m and transversely thereof, the strips 47, 48 are oppositely bowed to form a sleeve 53. At the locality of said sleeve portions, the strips 49, 50 are cut away so that the interior of the sleeve 53 will be clear for the reception of a feed nipple 54 which is provided with a plug 55 and is formed with longitudinally extending diametrically opposed feed slots 56 at one end thereof. The plugged end of said feed nipple 54 is sweated or otherwise suitably sealed in place within the sleeve 53 with the feed slots 56 in registry with the passageways formed by the perforated strips 49, 50. At the extremities of the branches 46 of the evaporator m, the end portions of the strips 47, 48 are oppositely bowed and brought together end to end to form sleeves 57. Return nipples 58, each closed at one end by means of a plug 59 and formed with a longitudinal slot, as at 60, are inserted into said sleeves 57 and sealed therein by sweating or otherwise with the slot 60 of each nipple 58 in registry with the passageway between the strips 49, 50 in its respective branch of the evaporator. The end portion of the feed nipple 54, projecting from the sleeve 53, extends through the back wall 18 of the jacket c and is internally threaded, as at 61, to receive the threaded end of a feed line for introducing a gaseous refrigerant into the evaporator m. Likewise, the corresponding end portions of the return nipples 58 extend through the said wall 18 of the jacket c and are internally threaded to receive gas lines returning to the refrigerating condenser. The joints between the nipples 54, 58 and said wall 18 are made secure in order that they may be liquid tight and for the further purpose of rigidly positioning the evaporator $m$ within the jacket $c$. The relation between evaporator $m$ and jacket walls, as best seen in Figs. 4 and 5, is such that the trunk 45 of the evaporator is spaced sidewise from the upper and lower walls 16, 15 of the upper header $d$ and edgewise from the front and back walls 17, 18 of said header. Correspondingly, the branches 46 of the evaporator $m$ are spaced sidewise from the inner and outer walls 15, 16 of the header connecting conduits $f$ and edgewise from the front and back walls 17, 18 of said conduits. With this relative arrangement of parts the descent of the liquid in the jacket $c$ from the upper header $d$, through the header connecting conduits $f$, to the lower header $e$ is substantially unobstructed by the evaporator $m$. Thus the liquid trapped in the unit A, under cooling, is free to circulate as the heat therein, acquired from the air passing between the tubes 13 of the core $b$, is given up to the gas in the evaporator $m$. Such circulation of the liquid is by gravity, the flow being from the upper header $d$ through the conduits $f$ to the lower header $e$ and thence back to the upper header $d$ through the tubes 13 of the core.

Under heating, with the valved fittings 22, 23 "open" and the evaporator $m$ inactive, the heated liquid fed into the upper header $d$ descends, through the tubes 13 of the core, to the lower header $e$ and thence flows into and via the return line 12 to the source of heat. Thus circulated by gravity, the flow of the liquid may be stimulated by force or reversed in opposition to gravity.

It is contemplated that the jacket $c$ be suitably heat insulated so that the exchange of heat, in the main, will occur at the core $b$ and between the liquid in the jacket $c$ and the air circulating between the tubes 13.

Changes in the specific form of my invention, as herein disclosed, may be made within the scope of what is claimed without departing from the spirit of my invention.

Having described my invention, what I claim as new and desire to protect by Letters Patent is:

1. A device for heating and cooling the tonneau compartment of a motor vehicle powered with an internal combustion engine having a liquid circulating system for cooling the same, said device including a heat exchange unit tapped into said system and comprising a heat transferring core, headers therefor and a conduit interconnecting said headers, one header receiving liquid from and the other header returning the liquid to said system, means for shutting off the unit from the system and trapping in said unit that part of the liquid of said system contained therein, referigerating means contained within the header connecting conduit, said means serving to cool the liquid in said conduit, and means for circulating the air of the tonneau compartment through said heat transferring core.

2. A heat transfer device for heating and cooling the tonneau compartment of a motor vehicle powered with an internal combustion engine having a water circulating system for cooling the same, said device including a heat exchange unit located in said compartment and tapped into said system, said unit comprising a plurality of spaced upright tubes and upper and lower headers therefor, one header for receiving engine cooling water from said system and the other for returning such water thereto, valved means for shutting off the unit from the system and trapping in said unit that part of the water of said system contained therein, a refrigerating element in the unit structure for cooling the water trapped in said structure, and a blower for circulating the air of the tonneau compartment through the core of said unit.

3. A device for heating and cooling the tonneau compartment of a motor vehicle powered with an internal combustion engine having a liquid circulating system for cooling the same, said device including a heat exchange unit having liquid circulating passageways therein, valved means tapping said unit into said system and adapted to trap in said unit that part of the liquid of said system therein contained, and refrigerating means housed within the unit for cooling the liquid trapped in said unit.

4. The combination with a liquid circulating system, associated with means for heating the liquid therein, of a heat exchange unit tapped into said system and having passageways therein for the circulation therethrough of the liquid in said system, valved means for shutting off said unit from the system and trapping in said unit that part of the liquid of said system contained therein, and refrigerating means housed within the unit and exposed to its contained liquid for cooling the same.

5. A heat exchange unit containing a heat transferring liquid, said unit comprising a core and a jacket therefor, said jacket providing upper and lower headers for the core and header connecting conduits at the sides of the core, and a refrigerating element inside of said jacket for cooling the liquid therein, said element having a reach coextensive with the upper header and branches coextensive with the header connecting conduits.

6. A heat exchange unit containing a heat transferring liquid, said unit comprising a core and a jacket therefor, said jacket providing upper and lower headers for the core and header connecting conduits at the sides of the core, an evaporator inside of the jacket for cooling the liquid therein, said evaporator being in the form of an inverted U, the trunk thereof being contained within and coextensive with the upper header, one branch being disposed in one of the header connecting conduits and the other branch similarly disposed in the other header connecting conduit, pipes connected with the evaporator for the ingress thereto and the egress therefrom of a refrigerating medium, said pipes being supported by the jacket structure and, in turn, supporting said evaporator, one of said pipes constituting an ingress conduit and being connected with the evaporator at the trunk thereof between the two branches, another of said pipes constituting an egress conduit and being connected with the extremity of one of said branches and still another of said pipes constituting a second egress conduit, the same being connected with the second branch at its extremity.

7. A heat exchange unit containing a heat transferring liquid, said unit comprising a core and a jacket therefor, said jacket providing upper and lower headers for the core and header connecting conduits at the sides of the core, an evaporator inside of the jacket for cooling the liquid therein, said evaporator being in the form of an inverted U, the trunk thereof being contained within and coextensive with the upper header, one branch being disposed in one of the header connecting conduits and the other branch similarly disposed in the other header connecting conduit, pipes connected with the evaporator for the ingress thereto and the egress therefrom of a refrigerating medium, said pipes being supported by the jacket structure and, in turn, supporting said evaporator, one of said pipes being connected with the trunk of the evaporator and two of said pipes being connected with said branches at the extremities thereof.

8. A heat exchange unit having a core consisting of a plurality of parallel tubes adapted to conduct a heat transferring liquid therethrough, said tubes being spaced apart and flattened and similarly reversely curved in transverse cross-section to form between them, then, circuitous air passageways through the core, a casing at the rear of the core, the interior of said casing being in communication with the passageways between said tubes, an open ended blower wheel of substantially the same length as said tubes located within the casing and arranged with its axis in parallelism with said tubes and at one side of center of the tube assembly, said casing having air admitting openings at top and bottom thereof in registry with the open ends of said wheel, the transverse projections of the rearward marginal portions of the tubes extending in the general direction of the blower and the transverse projections of the forward marginal portions of said tubes extending directly forwardly from said core.

9. A heat exchange unit having a core consisting of a plurality of parallel tubes adapted to conduct a heat transferring liquid therethrough, said tubes being spaced apart and flattened and similarly reversely directed transversely to form between them, thin, crooked air passageways through the core, a casing at the rear of the core, the interior thereof being in communication with the passageways between said tubes, a blower wheel located within the casing and arranged with its axis in parallelism with said tubes and at one side of center of the tube assembly, the transverse projections of the rearward marginal portions of the tubes extending in the general direction of the blower.

10. A heat exchange unit including a jacket for a heat transferring liquid and a strip-like evaporator within the jacket comprising facing strips and companion filler strips therebetween, said filler strips being formed with corresponding rows of perforations therein, the adjoining perforations in one row in one filler strip overreaching a common perforation in the corresponding row in the companion filler strip, whereby a number of thin circuitous passageways are provided between the facing strips along the evaporator structure for the refrigerant, the facing strips being oppositely bowed to form ingress and egress manifolds for the several passageways in said structure.

11. A thin, elongated heat exchange device comprising facing strips and a pair of companion filler strips therebetween, said strips being of sheet material lying face to face, one against the other, said filler strips having corresponding rows of perforations therein extending lengthwise thereof, the perforations in each row in one filler strip being so arranged with respect to the perforations in the corresponding row of the other filler strip that adjoining perforations in one overreach a common perforation in the other, whereby said filler strips and facing strips together provide a number of thin circuitous passageways between the facing strips, said passageways extending lengthwise of the structure, an ingress manifold at one end of the structure and an egress manifold at the other end thereof, said manifolds being in communication with the several passageways in said structure.

12. A thin, elongated heat exchange device comprising facing strips and a pair of companion filler strips therebetween, said strips being of sheet material lying face to face, one against the other, each filler strip being formed with a series of perforations therein extending lengthwise thereof, the perforations in one filler strip being so arranged with respect to the perforations in the other filler strip that adjoining perforations in one overreach a common perforation in the other, whereby said filler strips and facing strips together provide a thin circuitous passageway between the facing strips, said passageway extending lengthwise of the structure, means for conducting a heat exchange medium into said passageway at one end of the structure, and means for receiving such medium from said passageway at the other end of the structure and conducting it away therefrom.

CECIL PORTER ABRAMS.

---

CERTIFICATE OF CORRECTION.

Patent No. 2,082,998.            June 8, 1937.

CECIL PORTER ABRAMS.

It is hereby certified that error appears in the printed specification of the above numbered patent requiring correction as follows: Page 4, first column, line 14, claim 8, for the word "then" read thin; and that the said Letters Patent should be read with this correction therein that the same may conform to the record of the case in the Patent Office.

Signed and sealed this 20th day of July, A. D. 1937.

Henry Van Arsdale (Seal)                          Acting Commissioner of Patents.

conduit, pipes connected with the evaporator for the ingress thereto and the egress therefrom of a refrigerating medium, said pipes being supported by the jacket structure and, in turn, supporting said evaporator, one of said pipes being connected with the trunk of the evaporator and two of said pipes being connected with said branches at the extremities thereof.

8. A heat exchange unit having a core consisting of a plurality of parallel tubes adapted to conduct a heat transferring liquid therethrough, said tubes being spaced apart and flattened and similarly reversely curved in transverse cross-section to form between them, then, circuitous air passageways through the core, a casing at the rear of the core, the interior of said casing being in communication with the passageways between said tubes, an open ended blower wheel of substantially the same length as said tubes located within the casing and arranged with its axis in parallelism with said tubes and at one side of center of the tube assembly, said casing having air admitting openings at top and bottom thereof in registry with the open ends of said wheel, the transverse projections of the rearward marginal portions of the tubes extending in the general direction of the blower and the transverse projections of the forward marginal portions of said tubes extending directly forwardly from said core.

9. A heat exchange unit having a core consisting of a plurality of parallel tubes adapted to conduct a heat transferring liquid therethrough, said tubes being spaced apart and flattened and similarly reversely directed transversely to form between them, thin, crooked air passageways through the core, a casing at the rear of the core, the interior thereof being in communication with the passageways between said tubes, a blower wheel located within the casing and arranged with its axis in parallelism with said tubes and at one side of center of the tube assembly, the transverse projections of the rearward marginal portions of the tubes extending in the general direction of the blower.

10. A heat exchange unit including a jacket for a heat transferring liquid and a strip-like evaporator within the jacket comprising facing strips and companion filler strips therebetween, said filler strips being formed with corresponding rows of perforations therein, the adjoining perforations in one row in one filler strip overreaching a common perforation in the corresponding row in the companion filler strip, whereby a number of thin circuitous passageways are provided between the facing strips along the evaporator structure for the refrigerant, the facing strips being oppositely bowed to form ingress and egress manifolds for the several passageways in said structure.

11. A thin, elongated heat exchange device comprising facing strips and a pair of companion filler strips therebetween, said strips being of sheet material lying face to face, one against the other, said filler strips having corresponding rows of perforations therein extending lengthwise thereof, the perforations in each row in one filler strip being so arranged with respect to the perforations in the corresponding row of the other filler strip that adjoining perforations in one overreach a common perforation in the other, whereby said filler strips and facing strips together provide a number of thin circuitous passageways between the facing strips, said passageways extending lengthwise of the structure, an ingress manifold at one end of the structure and an egress manifold at the other end thereof, said manifolds being in communication with the several passageways in said structure.

12. A thin, elongated heat exchange device comprising facing strips and a pair of companion filler strips therebetween, said strips being of sheet material lying face to face, one against the other, each filler strip being formed with a series of perforations therein extending lengthwise thereof, the perforations in one filler strip being so arranged with respect to the perforations in the other filler strip that adjoining perforations in one overreach a common perforation in the other, whereby said filler strips and facing strips together provide a thin circuitous passageway between the facing strips, said passageway extending lengthwise of the structure, means for conducting a heat exchange medium into said passageway at one end of the structure, and means for receiving such medium from said passageway at the other end of the structure and conducting it away therefrom.

CECIL PORTER ABRAMS.

---

CERTIFICATE OF CORRECTION.

Patent No. 2,082,998.          June 8, 1937.

CECIL PORTER ABRAMS.

It is hereby certified that error appears in the printed specification of the above numbered patent requiring correction as follows: Page 4, first column, line 14, claim 8, for the word "then" read thin; and that the said Letters Patent should be read with this correction therein that the same may conform to the record of the case in the Patent Office.

Signed and sealed this 20th day of July, A. D. 1937.

Henry Van Arsdale (Seal)          Acting Commissioner of Patents.

CERTIFICATE OF CORRECTION.

Patent No. 2,082,998.  June 8, 1937.

CECIL PORTER ABRAMS.

It is hereby certified that error appears in the printed specification of the above numbered patent requiring correction as follows: Page 4, first column, line 14, claim 8, for the word "then" read thin; and that the said Letters Patent should be read with this correction therein that the same may conform to the record of the case in the Patent Office.

Signed and sealed this 20th day of July, A. D. 1937.

Henry Van Arsdale (Seal)

Acting Commissioner of Patents.